United States Patent [19]

Proeschl

[11] 4,230,254
[45] Oct. 28, 1980

[54] METHOD OF MAKING A MODULAR TRUCK BODY

[75] Inventor: Bernard E. Proeschl, Decatur, Ill.

[73] Assignee: Caterpillar Tractor Co., Peoria, Ill.

[21] Appl. No.: 966,841

[22] Filed: Dec. 6, 1978

Related U.S. Application Data

[62] Division of Ser. No. 850,433, Nov. 10, 1977, Pat. No. 4,162,096.

[51] Int. Cl.³ .................. B23K 31/02; B23P 21/00
[52] U.S. Cl. ........................ 228/182; 29/464; 29/469
[58] Field of Search ............ 228/182; 29/464, 469; 296/184, 196, 197

[56] References Cited

U.S. PATENT DOCUMENTS

| 3,901,535 | 8/1975 | Gee et al. ................ 296/197 X |
| 3,938,238 | 2/1976 | Kershaw et al. ................ 29/469 |
| 4,159,796 | 7/1979 | Braithwaite ................ 228/182 X |

Primary Examiner—Francis S. Husar
Assistant Examiner—Kenneth J. Ramsey
Attorney, Agent, or Firm—Paul S. Lempio

[57] ABSTRACT

A modular truck body comprises unitary first and second modules having bottom sections thereof secured together at a separation line which is substantially offset laterally from a longitudinal axis of the truck body. The width of the first module is thus substantially larger than the width of the second module. The modules are aligned and preassembled at a manufacturing plant by releasably securing them together at the separation line therebetween. The modules are then disassembled and shipped to a remote job site or the like for final reassembly and securance of the modules together.

7 Claims, 8 Drawing Figures

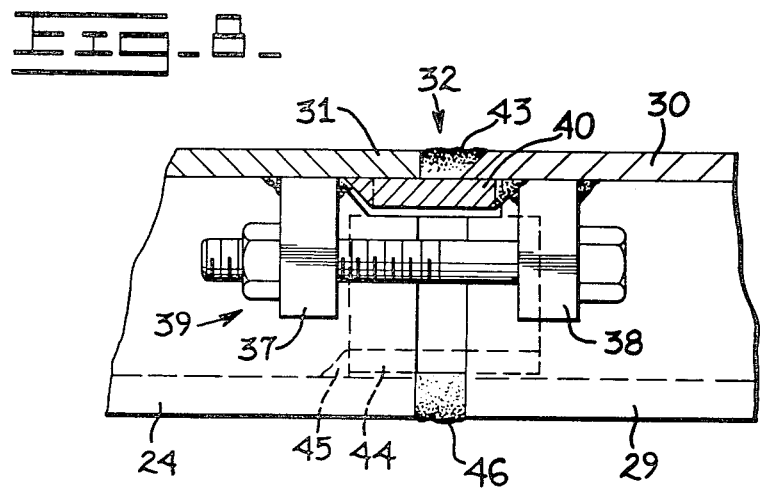
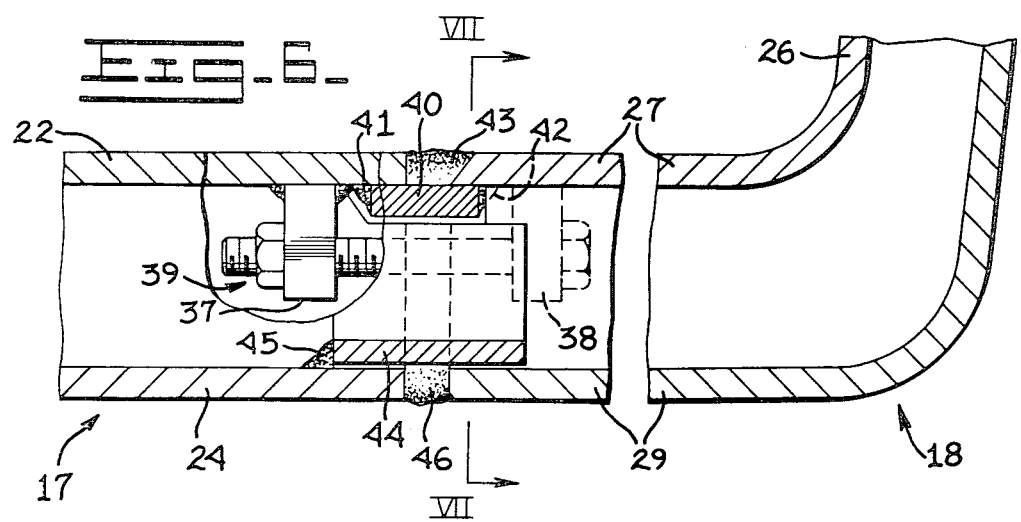

METHOD OF MAKING A MODULAR TRUCK BODY

This is a division of Ser. No. 850,433, filed Nov. 10, 1977 now U.S. Pat. No. 4,162,096 issued July 24, 1979.

BACKGROUND OF THE INVENTION

Large trucks of the off-highway type give rise to shipping problems since various state regulations restrict the shipping thereof on commercial carriers. A truck body is normally fully fabricated at a manufacturing facility to secure the various plate and beam members thereof together. One prior art technique for overcoming the shipping problems is one of cutting the completed truck body into several sections at the various weld joints to separate the truck body into component parts for shipping purposes.

The component parts are then reassembled and aligned at a remote job site by utilization of relatively complex fixtures and methods for applying high quality welds to the weld joints which have been severed previously. Such a procedure is laborious and time consuming and occasionally the resulting welds may be found defective to impair the overall structural integrity of the completed truck body.

A more recent solution to the shipping problems may be found in U.S. Pat. No. 3,938,238, assigned to the assignee of this application. As disclosed in this patent, a truck body is fabricated to comprise a bottom section and a pair of side sections which are preassembled at a manufacturing facility, disassembled for shipping purposes and thereafter reassembled and secured together at a remote job site. A front module and canopy module are thereafter secured to the other modules to complete the truck body for mounting on the undercarriage of a vehicle.

As will be hereinafter described, the modular truck body and method of this invention constitute improvements over that disclosed in U.S. Pat. No. 3,938,238. In particular, assembly time and the number of welds employed are substantially reduced and the integrated truck body exhibits a substantial increase in structural integrity thereover. Regarding the latter desideratum, loads imposed upon the floor section of a truck body during the loading and carrying phases of vehicle operation tend to exert substantial forces thereon.

SUMMARY OF THIS INVENTION

The present invention is directed to overcoming one or more of the problems as set forth above.

In carrying forth the method steps of this invention, unitary first and second L-shaped modules are fabricated and disposed in side-by-side relationship at a manufacturing facility, a bottom section of the second module having a lateral width substantially less than the width of a bottom section of the first module. The modules are releasably attached together to form a pre-assembled and fully aligned truck body and a back-up plate is secured to the bottom section of the first module to overlie the bottom section of the second module. The modules are then detached and shipped to a remote job site or the like whereat the modules are again disposed in aligned, side-by-side relationship with the aid of the back-up plate, releasably attached together, and fixedly secured together at their separation line. The method is thus substantially simplified over prior art methods and results in a truck body exhibiting a greater degree of structural integrity than conventional ones of the type described above.

BRIEF DESCRIPTION OF THE DRAWINGS

Other objects of this invention will become apparent from the following description and accompanying drawings wherein:

FIG. 5 is an enlarged view of a forward portion of the truck body and secured canopy module, taken within circle V in FIG. 1;

FIG. 8 is an enlarged sectional view, taken in the direction of arrows VIII—VIII in FIG. 3, illustrating means for securing front sections of the modules together.

DETAILED DESCRIPTION

Figure 1:
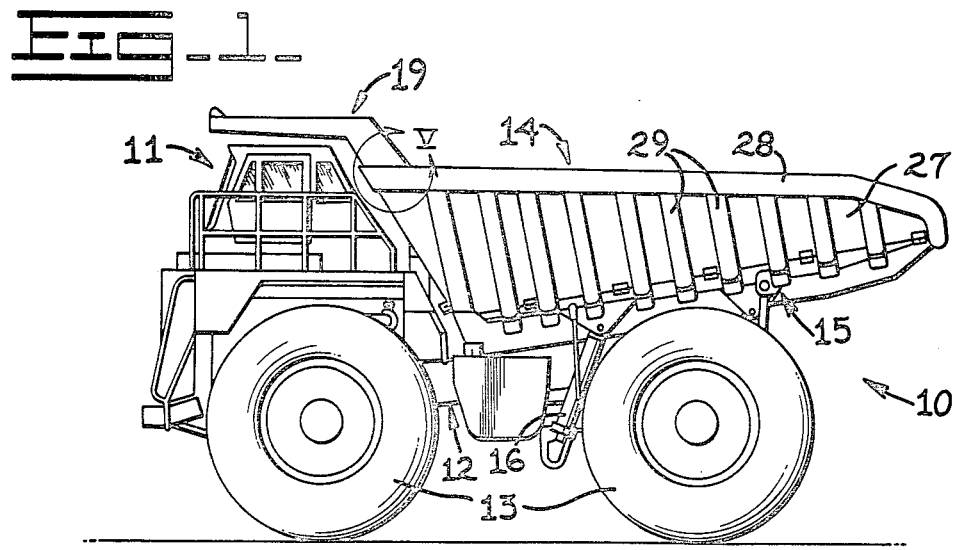
FIG. 1 is a side elevational view of a truck employing the modular truck body of this invention thereon.

FIG. 1 discloses an off-highway truck 10 comprising an operator's station or cab 11, a main frame 12 of an undercarriage and a plurality of roadwheels 13 suitably mounted on the frame in a conventional manner. A modular truck body 14 of this invention is pivotally mounted at its rearward end on the frame by a pair of laterally spaced pivot means 15 (one shown). A pair of double-acting hydraulic cylinders 16 (one shown) are pivotally interconnected between the frame and the truck body to selectively tilt the truck body rearwardly about pivot means 15 for dumping purposes.

Figure 2:
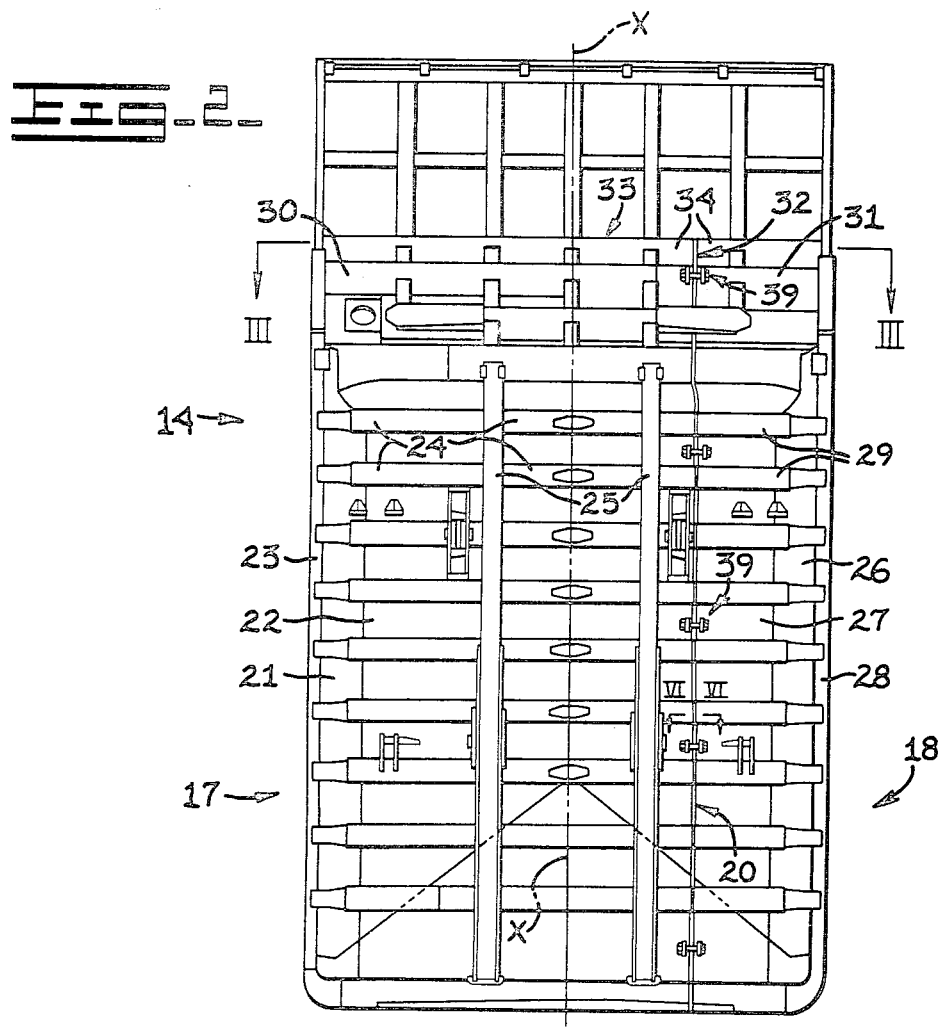
FIG. 2 is an enlarged bottom plan view of the truck body.

Referring to FIG. 2, showing truck body 14 in bottom plan view, the truck body comprises a first module 17, a second module 18 disposed in side-by-side relationship with respect to the first module and a third or canopy module 19. As will be described hereinafter, the three modules constituting the truck body may be fabricated and preassembled at a manufacturing facility and thereafter detached from each other for shipment to a remote job site or the like whereat the modules may be fixedly secured together and mounted on frame 12 of truck 10 (FIG. 1). Modules 17 and 18 are secured together at a separation line 20, extending the full lengths thereof and substantially offset in a lateral direction relative to a longitudinal axis X of the truck body.

First module 17 is generally L-shaped in cross section to define a generally vertical first side section 21 and a generally horizontal first bottom section 22. An elongated rail 23 is secured to an upper edge of the side section and a plurality of longitudinally spaced and laterally extending L-shaped ribs 24, having a decreasingly shorter vertical height towards a rearward end of the truck body, are secured to the undersides of the bottom and side sections. The ribs are interrupted by a pair of longitudinally extending and laterally spaced beams 25, secured to the underside of bottom section 22 and disposed on either side of longitudinal axis X of the truck body.

Second module 18 also comprises a generally L-shaped cross section to define a generally vertical second side section 26, spaced laterally from first side section 21, and a generally horizontal second bottom section 27. It should be noted in FIG. 2 that the lateral width of second bottom section 27 is substantially less than the lateral width of first bottom section 22 whereby the integrated truck body is provided with a high degree of structural integrity, particularly in the central floor area of the truck body whereat the magnitude of loading is the greatest. An elongated rail 28 is secured to an upper edge of second side section 26 and a plurality of longitudinally spaced and L-shaped ribs 29, also having a decreasingly shorter vertical height towards a rearward end of the truck body, are secured to an underside of second module 18 and are disposed in alignment with ribs 24.

Figure 3:
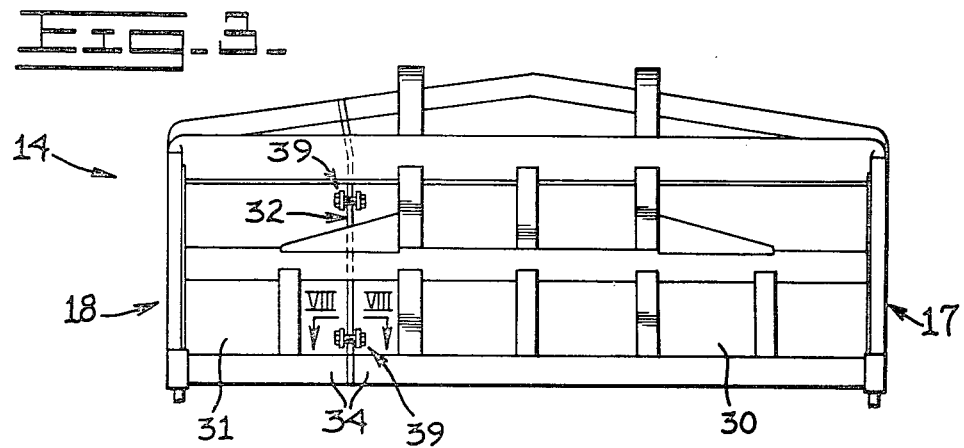
FIG. 3 is an inverted, front elevational view of the truck body, taken in the direction of arrows III—III in FIG. 2.
Figure 4:
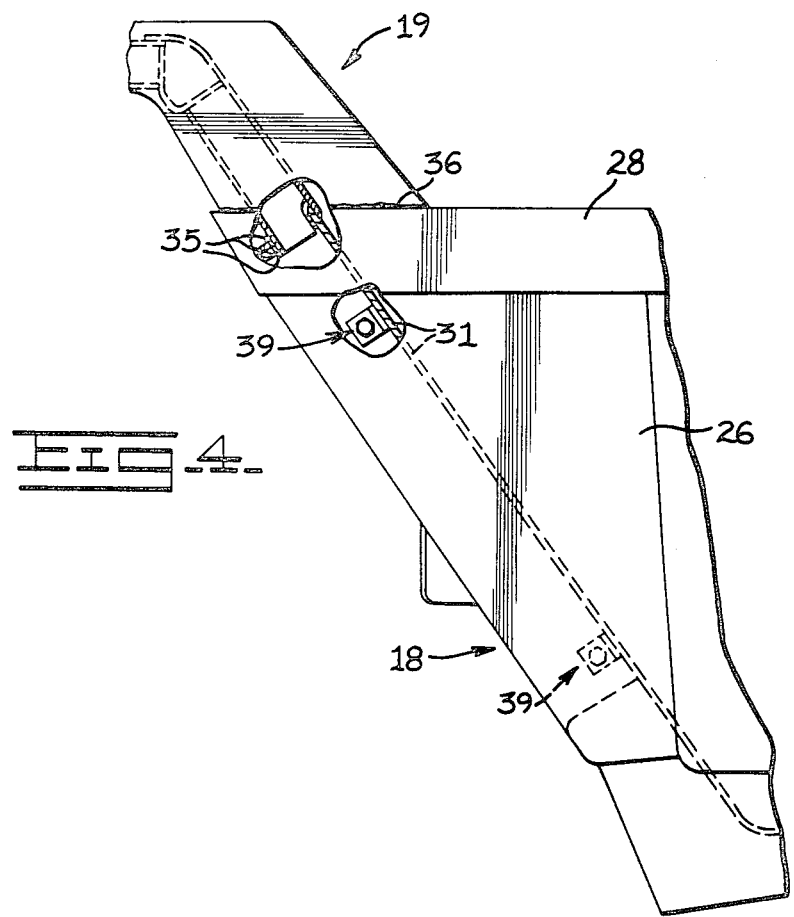
FIG. 4 is an enlarged and partially sectioned side elevational view, illustrating a forward end of the truck body having a canopy module secured thereon.

Referring to FIG. 3, module 17 further comprises a front section 30 formed integrally with side section 21 and bottom section 22. Likewise, second module 18 comprises a front section 31 formed integrally with side section 26 and bottom section 27. Front sections 30 and 31 are aligned laterally relative to each other and meet at a separation line 32 which is conterminous with separation line 20 (FIG. 2).

Referring to FIGS. 1, 2, 4 and 5, canopy module 19 is preferably secured on a forward end of the truck body and to modules 17 and 18 at a separation line 33 to overlie and protect operator's station 11. As more clearly shown in FIG. 5, the canopy module is secured to a laterally extending rail 34 formed in two sections and secured on the upper edges of front sections 30 and 31 (FIG. 3), by welds 35. The canopy module is further secured to each upper rail 23 and 28 of modules 17 and 18, respectively, by a weld 36 (one shown in FIGS. 4 and 5).

Figure 6:
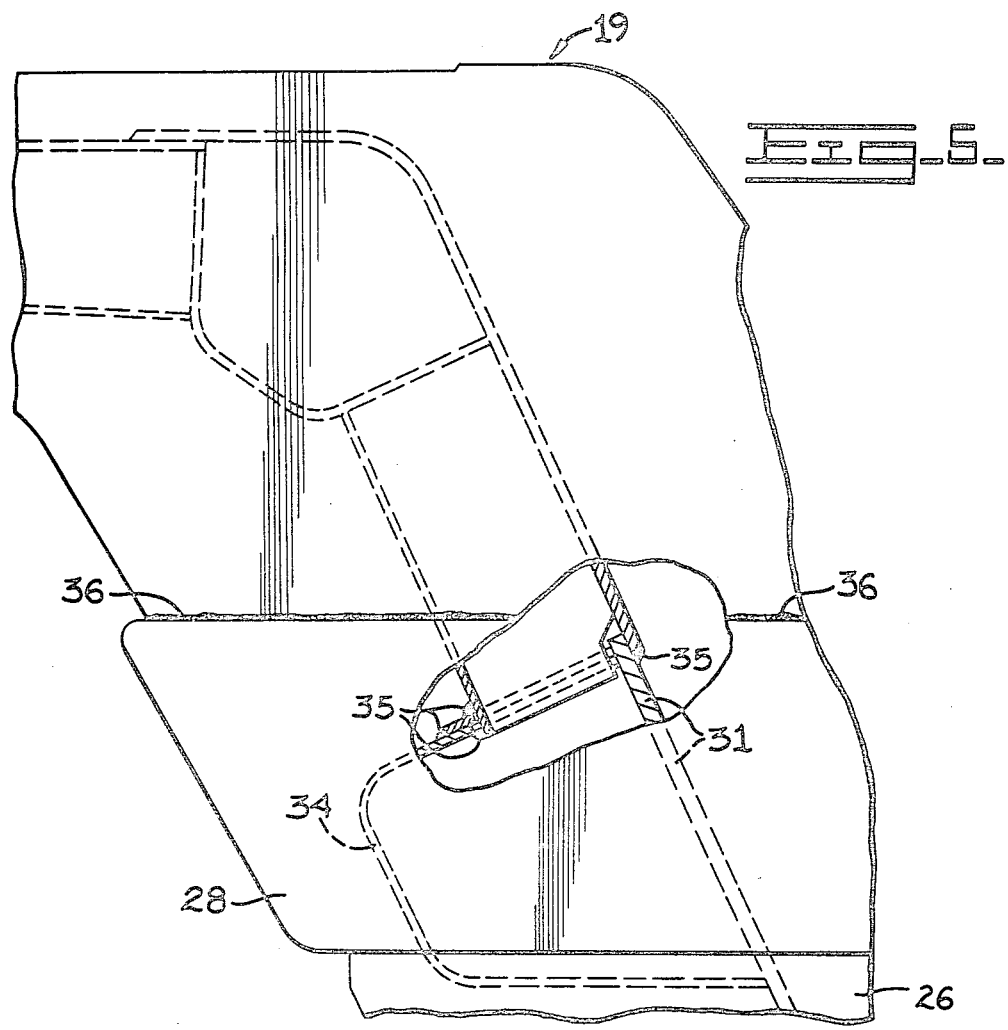
FIG. 6 is an enlarged sectional view, taken in the direction of arrows VI—VI in FIG. 2, illustrating means securing bottom sections of a pair of modules of the truck body together.

The means for securing modules 17 and 18 together will now be described with particular reference to FIGS. 2, 3 and 6-8. Referring to FIGS. 6 and 8, a pair of brackets 37 and 38 are secured to the undersides of modules 17 and 18, respectively. The brackets are disposed longitudinally between respective longitudinally spaced pairs of ribs 24 and 29 and are secured together by releasable fastening means 39, such as the illustrated bolt-type fasteners.

Figure 7:
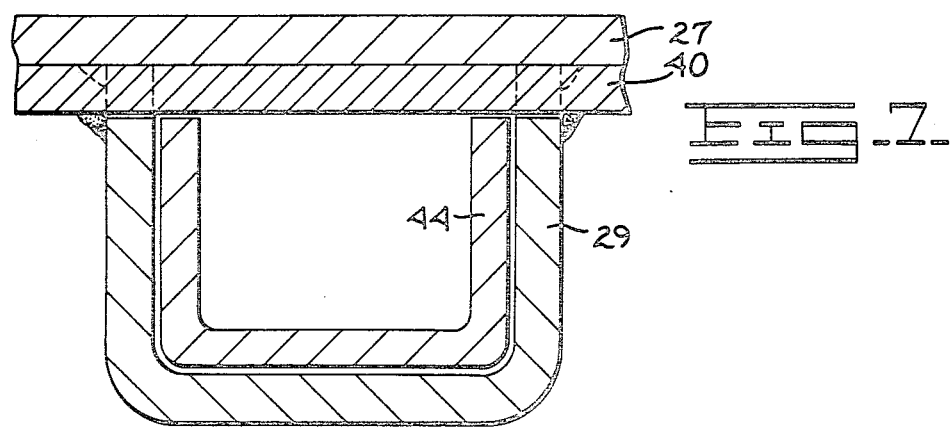
FIG. 7 is a sectional view taken in the direction of arrows VII—VII in FIG. 6.

A combined weld back-up and guide strip or plate 40 overlaps the full length of separation lines 20 and 32 between each modules 17 and 18 and is accommodated within cutouts suitably formed on the undersides of ribs 24 and 29 (FIGS. 6-8). Each plate is secured to modules 17 and 18 by longitudinally extending welds 41 and 42, respectively. The separation line defines an elongated and generally V-shaped groove having a continuous weld 43 deposited therein to secure the modules together along with plates 40.

As further illustrated in FIGS. 6 and 8, a second combined weld back-up and guide plate 44, also having cutouts formed thereon to accommodate plate 40, is solely secured to a respective rib 24 of module 17 by a U-shaped weld 45. The latter plate is also U-shaped and overlaps the separation line to be disposed in sliding relationship within a respective rib 29. A U-shaped weld 46 is deposited within the generally V-shaped groove defined at the separation line between the ribs to complete the structural integration of bottom sections 22 and 27.

Referring to FIGS. 3 and 8, it should be noted that front sections 30 and 31 of modules 17 and 18, respectively, are secured together in a like manner. Thus, plates 40 are structurally integrated within the fabricated truck body to close and reinforce separation line 32, along with welds 43. Each pair of laterally adjacent and aligned ribs 24 and 29, secured beneath the front sections, are secured together by a respective U-shaped plate 44 and U-shaped weld 46 which extends about the three sides of the ribs. As described hereinafter, plates 40 and 44 further function as guide means to aid in aligning and interlocking the modules relative to each other upon final securance thereof together at a remote job site.

PRE-ASSEMBLY OPERATION

Referring to FIG. 2, modules 17, 18 and 19 are each prefabricated at a manufacturing facility for individual shipment to a customer's job site for the final assembly operation. At such facility, modules 17 and 18 are disposed in their illustrated side-by-side relationship and attached together by fastening means 39 to dispose them in proper alignment. At this stage of the operation, plate 40 (more than one plate could be utilized, if so desired) is solely secured to bottom section 22 of module 17 by weld 41 (FIG. 6) whereas each plate 44 is solely secured internally to a respective rib 24.

Upon prealignment of partially fabricated modules 17 and 18, plates 40 will function to guide the modules in their proper alignment whereby brackets 37 and 38 may be welded in place and fastening means 39 maybe tightened-down to maintain the modules in their preassembled condition. It should be noted that module 17 may be completely fabricated with rail 23, ribs 24 and beams 25 secured in place by welding thereon. Likewise, module 18 is completely fabricated with rail 28 and ribs 29 welded in place thereon. Canopy module 19 is secured to modules 17 and 18 during the final assembly operation, as described hereinafter.

FINAL ASSEMBLY OPERATION

Upon release of fastening means 39, modules 17, 18, 19 are shipped to a remote job site for final assembly. At such job site, modules 17 and 18 are again realigned in their inverted positions, as shown in FIG. 2, and fastening means 39 are again secured thereto to maintain them in their proper relative positions. It should be noted that plates 40 and 44 function to guide the modules into proper alignment and also interlock them together to prevent both vertical and longitudinal movement of the modules relative to each other. Welds 42 and 46 are then applied to the modules to secure them together. If so desired, fastening means 39 may remain in their installed positions to form part of the securing means along with welds 41, 42, 43, 45 and 46 and plates 40 and 44 or they may be removed for reuse.

Upon turning-over of the partially completed truck body to its upright position, continuous weld 43 is formed to further secure bottom sections 22 and 27 together. Canopy module 19 is then secured in place, as described above, to form the completed and structurally integrated truck body. The truck body may then be mounted on the chassis of truck 10 (FIG. 1) in a conventional manner.

From the above description it can be seen that the truck body embodying this invention can be prefabricated, preassembled, shipped and assembled at a remote job site in a relatively expeditious and efficient manner.

The fact that only three major modules (17, 18 and 19) are involved substantially reduces fabrication and alignment problems. In addition, only one continuous major weld 43 is required along co-terminous separation lines 20 and 32 to further expedite the operation. Employment of major weld 43 and attendant welds 41, 42, 45 and 46 in offset relationship relative to the central longitudinal axis X of the truck body substantially increases the structural integrity of the integrated truck body, particularly in the central floor area thereof, i.e., substantially larger first bottom section is void of welds in the plate forming the floor thereof. As suggested above, the central floor area is subjected to the greatest magnitude of load both during the loading and carrying phases of vehicle operation.

The embodiments of the invention in which an exclusive property or privilege is claimed are defined as follows:

1. A method for making a truck body disposed on a longitudinal axis thereof comprising the steps of
    fabricating a unitary first module to have a generally L-shaped cross section defining a generally vertical first side section and a generally horizontal first bottom section,
    fabricating a unitary second module to have a generally L-shaped cross section defining a generally vertical second side section and a generally horizontal second bottom section having a lateral width substantially less than the lateral width of said first bottom section,
    disposing and aligning said first and second modules in side-by-side relationship to define a separation line between said first and second bottom sections extending the full length thereof and laterally disposed in substantial offset relationship relative to the longitudinal axis of the composite first and second modules forming said truck body,
    releasably attaching said first and second modules together at said separation line to form a pre-assembled and fully aligned truck body,
    securing a back-up plate to a free edge of said first bottom section, to overlie an edge of said second bottom section, after said attaching step,
    detaching and separating said first and second modules from each other at said separation line,
    shipping said separated first and second modules to a remote location,
    again disposing and aligning said first and second modules in side-by-side relationship at said separation line while simultaneously guiding such alignment by overlapping said separation line with said back-up plate,
    again releasably attaching said first and second modules together at said separation line, and
    fixedly securing said first and second modules together at said separation line to form a structurally integrated truck body, including the step of welding said back-up plate to said first and second modules adjacent to said separation line.

2. The method of claim 1 further comprising the step of securing a canopy module on a forward end of said first and second modules subsequent to said shipping step.

3. The method of claim 1 wherein said first-mentioned releasably attaching step comprising releasably attaching said first and second modules together by a plurality of releasable fasteners.

4. The method of claim 1 wherein said step of fabricating a unitary first module comprises the step of securing a plurality of laterally extending and longitudinally spaced ribs to an underside of said first module.

5. The method of claim 4 wherein the step of fabricating a unitary second module comprises the step of securing a plurality of laterally extending and longitudinally spaced ribs to an underside of said second module.

6. The method of claim 5 wherein the step of fabricating said first module comprises the step of securing a second back-up plate internally to each rib of said first module.

7. The method of claim 6 wherein said last-mentioned disposing and aligning step comprises guiding each pair of laterally aligned ribs of said first and second modules together with said second back-up plate by slidably mounting said second back-up plate with the rib secured to said second module and wherein said fixedly securing step comprises welding said pair of ribs to said second back-up plate.

* * * * *